(12) United States Patent
Wang et al.

(10) Patent No.: US 7,594,756 B2
(45) Date of Patent: Sep. 29, 2009

(54) ROLLING MEMBER GUIDING STRUCTURE

(75) Inventors: Chin-Pei Wang, Taichung (TW); Hsing-Neng Chou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 732 days.

(21) Appl. No.: 10/984,419

(22) Filed: Nov. 8, 2004

(65) Prior Publication Data
US 2006/0098903 A1 May 11, 2006

(51) Int. Cl.
*F16C 29/06* (2006.01)
(52) U.S. Cl. .......................................... 384/43; 384/45
(58) Field of Classification Search ................... 384/43, 384/45, 44
See application file for complete search history.

(56) References Cited
U.S. PATENT DOCUMENTS

| 3,044,835 | A | * | 7/1962 | Hurd | 384/45 |
| 3,478,402 | A | * | 11/1969 | Pohler et al. | 29/898.066 |
| 3,752,541 | A | * | 8/1973 | McVey | 384/44 |
| 4,637,739 | A | * | 1/1987 | Hattori | 384/45 |
| 5,193,914 | A | * | 3/1993 | Tanaka | 384/45 |

* cited by examiner

*Primary Examiner*—William C Joyce
(74) *Attorney, Agent, or Firm*—Apex Juris, pllc; Tracy M. Heims

(57) ABSTRACT

A rolling member guiding structure installed in the circulation tunnel of a sliding block in a linear transmission mechanism. The guiding structure has a bar shaped part disposed along the inner wall of the circulation tunnel of the sliding block so as to form the inner cavity of the circulation tunnel into a predetermined guiding space thereby guiding the rolling members to circulate along the circulation tunnel heading to a predetermined direction. With this structure, the contact area between the rolling member and the circulation tunnel can be minimized so as to reduce the frictional resistance to the rolling member and smooth the operation of the linear transmission mechanism.

8 Claims, 8 Drawing Sheets

ROLLING MEMBER GUIDING STRUCTURE

BACKGROUND OF THE INVENTION

1. Field of the Invention

The present invention relates to a rolling member guiding structure, and more particularly, to a guiding structure to be used to stabilize the moving direction of a sliding block so as to cause the rolling member to be able to circulate smoothly in a linear transmission mechanism for use in the tool machine or the automatic manufacturing machine, used in the electronic and semiconductor industry.

2. Description of the Prior Art

In a conventional linear transmission mechanism, its rolling member is composed of a plurality of rolling balls and spacers, and a connecting chain for the spacers. Therefore, the cyclic guiding structure should be configured to match the profile of the rolling member and it is designed in three types. The first type is integrally formed in one piece such as one disclosed by U.S. Pat. No. 5755516, but the injection molding process is applied due to its complicated structure. The existing problems to be solved include the following.

The strict allowable dimensional deviation existing between the size of the cyclic guiding structure and the sliding block make it difficult to control the shrinking fit for the guiding structure.

Secondly, high fabrication technique is required to overcome the difficulty in forming a hollow circulation tunnel in an internal circulation guide structure so as to allow the rolling member to circulate stably therein.

In addition, such a structure needs a considerably broad contact area between the rolling member and the circulation tunnel that results in a large frictional force and greatly retards the motion of the rolling member.

A typical two piece circulation guiding structure is represented by U.S. Pat. No. 6524003, wherein a tubular structure is formed by coupling two semi-circular tube parts using a plastic injection molding process. That method substantially reduces the problem of shrinking deformation, as that is significant in the one piece structure of type 1. However, there arises the extra problems of shrinking deformation caused by its slim and elongated structure; difficulty in coupling two semi-circular tube parts to each other and then precisely mating with the tunnel path formed in the sliding block. Besides, the problem of unprofitably large contact area existing between the rolling member and its guiding structure enclosing around it still can not be solved to improve the circulation of the rolling member.

The third type of circulation guiding structure, which is analogous to the second one, is structured to enclose only half the portion of the rolling member as that disclosed by U.S. Pat. No. 6203199, in which the upper and the lower walls are used to control the motion of the rolling member. The structure is also created by using the plastic molding process, which being similar to aforesaid two types, can not be free from the problems of shrinking deformation and an ineligible frictional resistance caused by a large contact area as that described in the former two types of structure. The dimensional deviation caused by shrinking deformation may lead to retardation of the rolling member by the circulation guiding structure and, in the worst case scenario, the function of the linear transmission mechanism may be completely blocked.

For these reasons the inventor has put forth every effort for years by continuous research to palliate the inherent shortcomings of the conventional techniques described above, and at last has succeeded in realizing the present invention.

SUMMARY OF THE INVENTION

Accordingly, the present invention is aimed to provide a rolling member guiding structure which can substantially reduce the frictional resistance when the rolling member travels in the circulation tunnel and stably holds onto its exact heading direction.

For this, in the present invention, it is the prior consideration how to make use of limited available circulation space, and to palliate the disadvantage of a large contact area between the rolling member and the circulation tunnel by introducing a novel idea of minimizing the contact area by utilizing contact of a circular profile to a multi-edged profile, or a circular profile to another circular profile so as to create an elaborate contact profile for the rolling member guiding structure. In the prior art, a recessed structural design is used wherein an arcuate profile enclosing the rolling member is used to guide the rolling member to circulate in the linear transmission mechanism. However, in the present invention, a protruded structural design wherein a circular profile or a multi-edged profile is introduced to guide the rolling member for circulation so as to minimize the contact area thereby reducing the frictional resistance and smoothing the circulation.

In another aspect of the present invention, the idea of a circular profile to circular profile, or a circular profile to multi-edged profile is introduced in which a circularly profiled or a multi-edged profiled bar structure is placed in the inner wall surface of the circulation tunnel so as to form the circulation space in the circulation tunnel of the present invention thereby guiding the rolling member to hold its exact heading direction during circulation in the circulation tunnel.

Furthermore, in the present invention, the bar structure may be formed into single contact, dual contact or multi-contact types, among them the dual contact and the multi-contact types can be formed of a plurality of single contact components or integrally molded into one piece. The guiding structure may be fixed to the accessories provided at the both terminals of the sliding block in the form of a retaining notch or a protuberance, or alternatively, the above retaining notch or protuberance may be provided on both end covers of the sliding block so as to fix the guiding structure onto the sliding block.

The rolling member guiding structure of the present invention is so simply constructed that it can be fabricated by common injection process, or by directly bending a metallic bar to form into a frame shape configuration. Therefore, the production cost may be considerably curtailed.

In proof of the innovative and technological content of the invention herein, please refer to the detailed description of the invention and the accompanying brief description of the drawings appended below. Furthermore, the attached drawings are provided for purposes of reference and explanation, and shall not be construed as limitations applicable to the invention herein.

DETAILED DESCRIPTION OF THE PREFERRED EMBODIMENT

Figure 1:
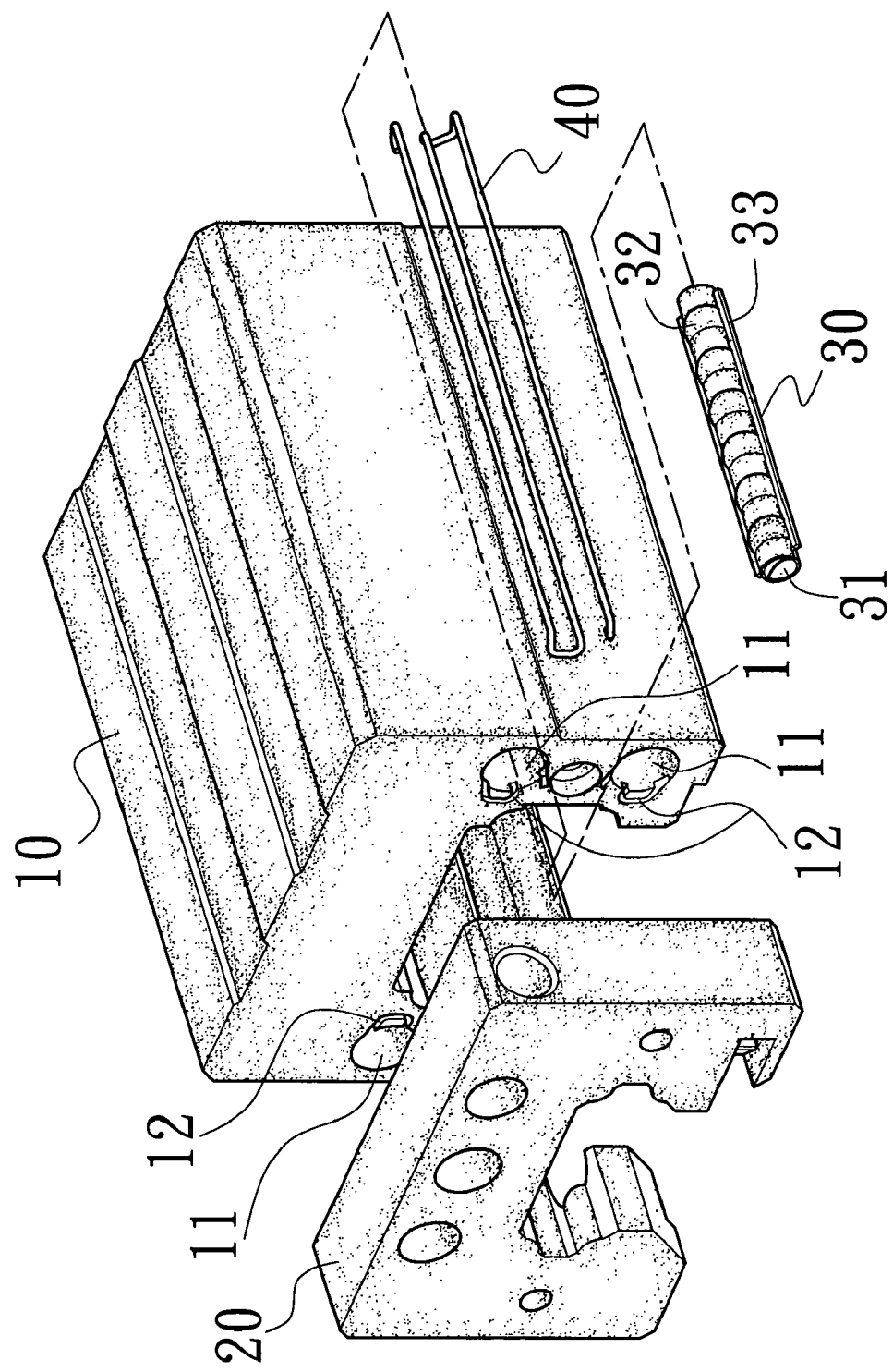
FIG. 1 is a schematic view of the sliding block of the present invention.

Referring to FIG. 1, which is a schematic view of the sliding block of the present invention, wherein the guiding structure is a frame formed with a bar, guiding frame 40, the sliding block 10 includes two end covers 20, a plurality of rolling members 30 composed of spacers 31, rolling elements 32 and their linking chain 33. The sliding block 10 contains a circulation tunnel 11 in which a guiding frame 40 having three guiding spots is equipped for guiding the rolling member 30 to circulate along the circulation tunnel 11 heading in its predetermined direction. Each of the end covers 20 of the sliding block 10 has a retaining slot 12 to tighten the guiding frame 40 in position.

Figure 2:
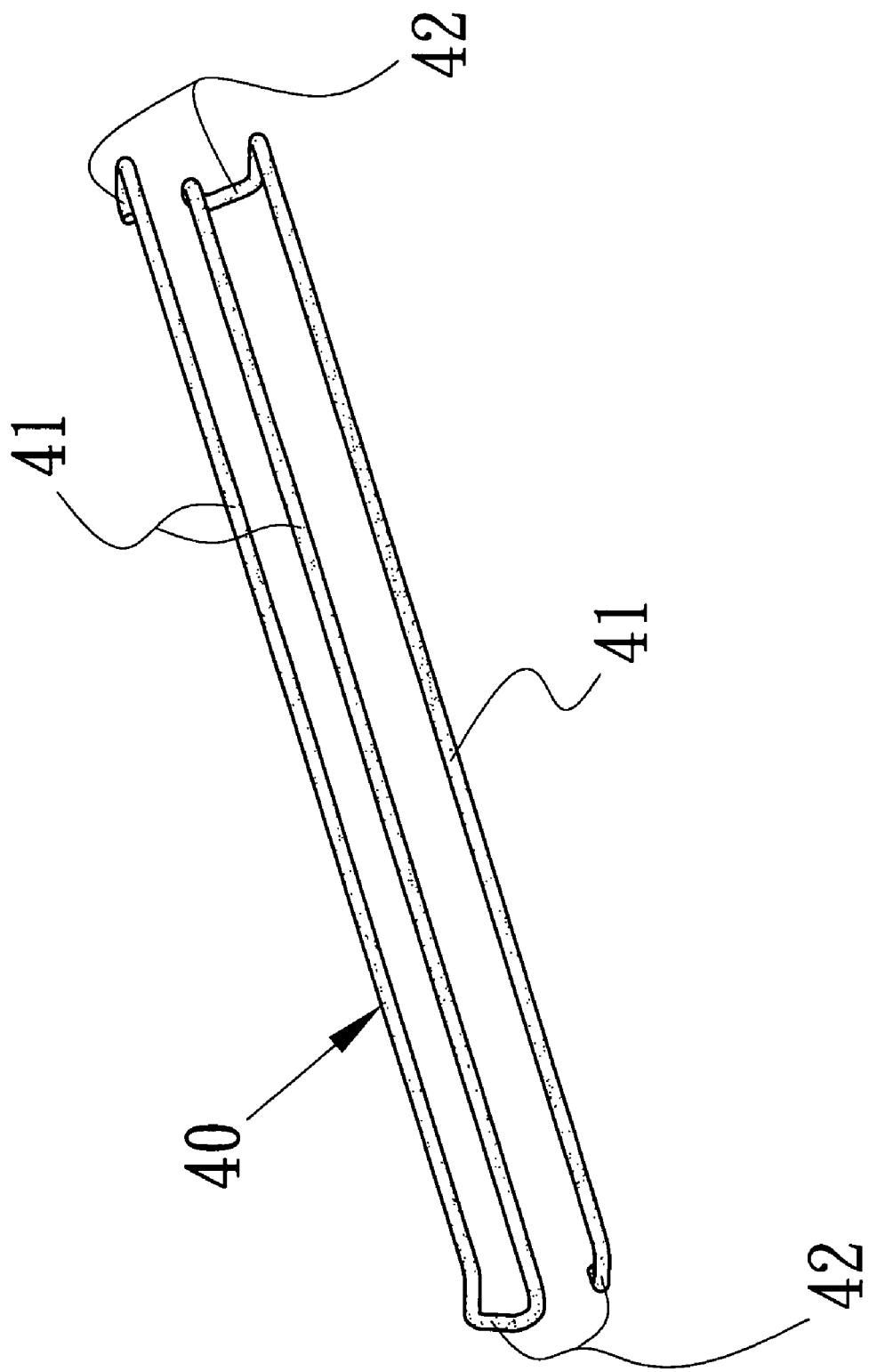
FIG. 2 is a detailed view of the guiding structure shown in FIG. 1.

The multi-contact structured guiding frame disclosed by the present invention has more than two guiding spots. FIG. 2 is a detailed view of the guiding structure shown in FIG. 1. In this embodiment, the guiding frame 40 is designed to a multi-contact structure and fabricated integrally in one piece using its curved portion as a retaining position. The three guiding spots 41 of the guiding frame 40 are that shown respectively on the three positions in the circulation tunnel 11 of FIG. 1 for guiding circulation of the rolling members 30. On the other hand, the guiding frame 40 is fixed stationary to the sliding block 10 by coupling its retainer 42 with the retaining slot 12 formed on the end cover 20 of the sliding block 10 as shown in FIG. 1.

Figure 3A:
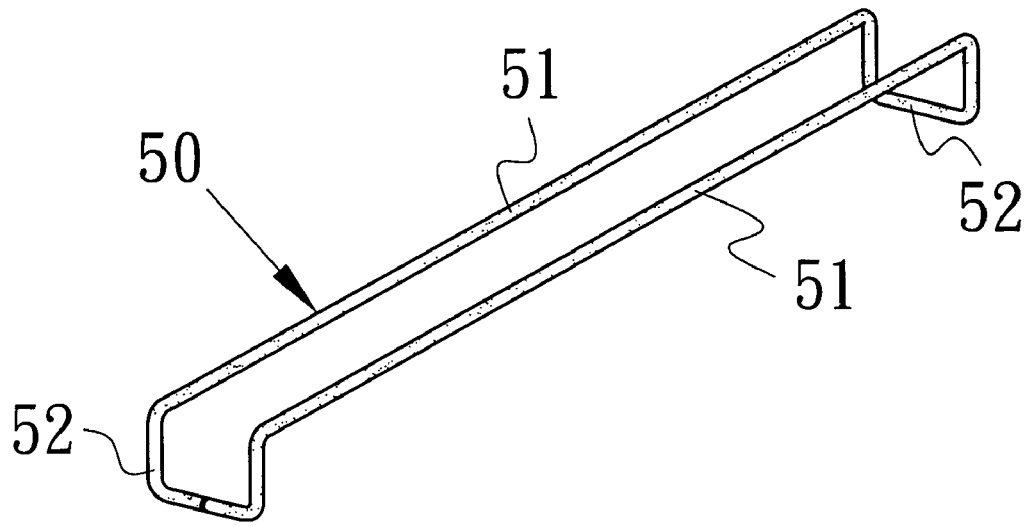
FIGS. 3(A) through 3(B) are schematic views of the guiding structure in another embodiment of the present invention.
Figure 3B:
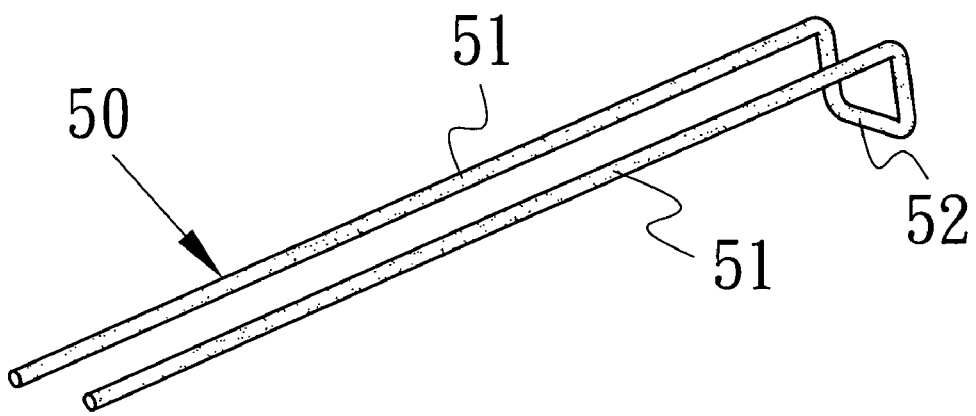

Referring to FIGS. 3(A) through 3(B), which show schematic views of the guiding structure in another embodiment, the guiding frame 50 formed into a dual contact configuration has two guiding spots 51. Here, FIG. 3(A) is, a two terminal retaining configuration with a retainer 52 provided at each end to couple with the guiding frame 50. On the other hand, FIG. 3(B) expresses a single terminal design having one retainer 52 at one end, while the other end can be fixedly inserted into the corresponding component structure.

Figure 4A:
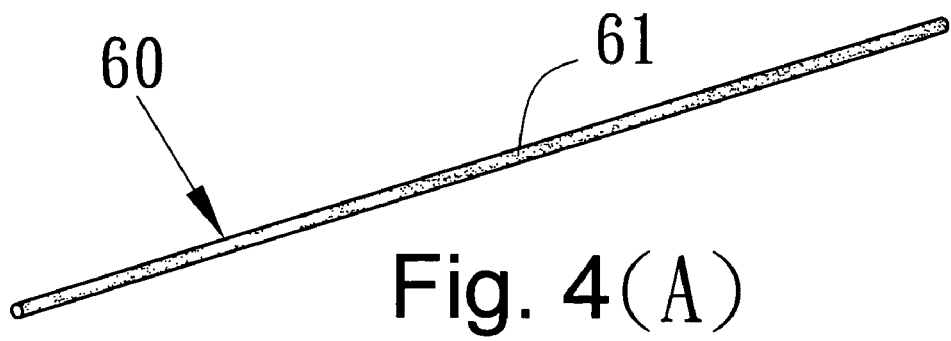
FIGS. 4(A) through 4(C) are schematic views of the guiding structure in a third embodiment of the present invention.
Figure 4B:
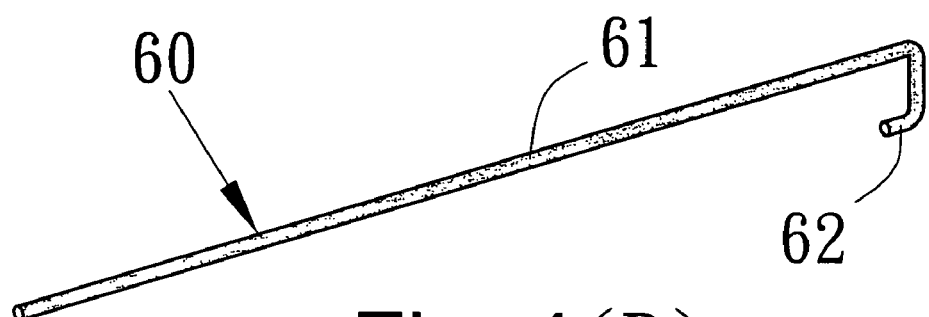
Figure 4C:
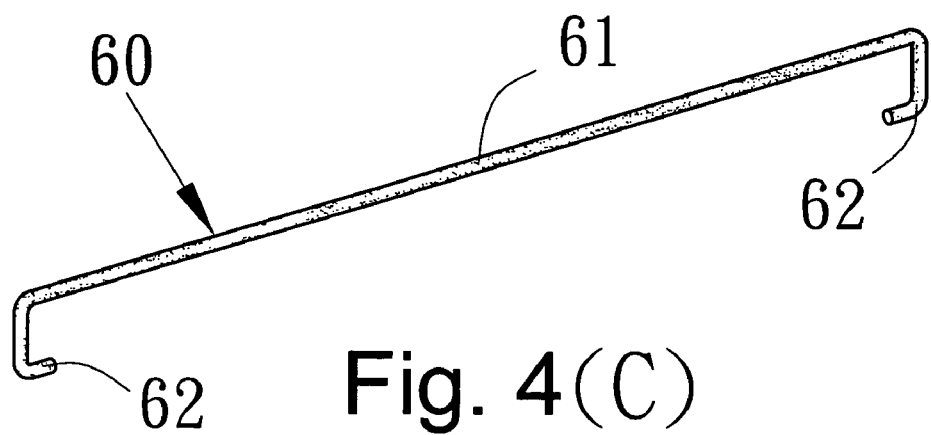

Referring to FIGS. 4(A) through 4(C), which show the guiding structure in a third embodiment, the guiding frame 60 is designed as a single contact structure having only one guiding spot 61. It is configured into three types of fixing manners: FIG. 4(A) shows two terminal insertion types, wherein the guiding frame 60 is a simple cylindrical rod (or a rectangular parallelepiped rod) to be fixedly inserted into the corresponding component structure. In FIG. 4(B), the guiding frame 60 has a retainer at one end and the other end is formed into a terminal insertion type like that shown in FIG. 4(A). FIG. 4(C) shows a two terminal retainer type, and both terminals are provided with a retainer 62.

Figures 5A, 5B:
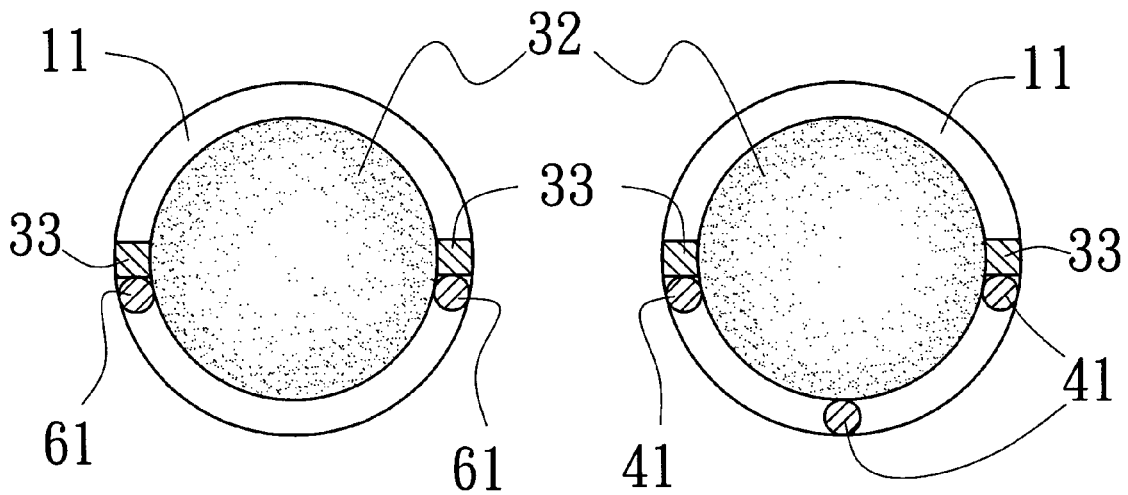
FIGS. 5(A) through 5(D) are schematic views showing how the guiding frame is installed with the rolling member.
Figures 5C, 5D:
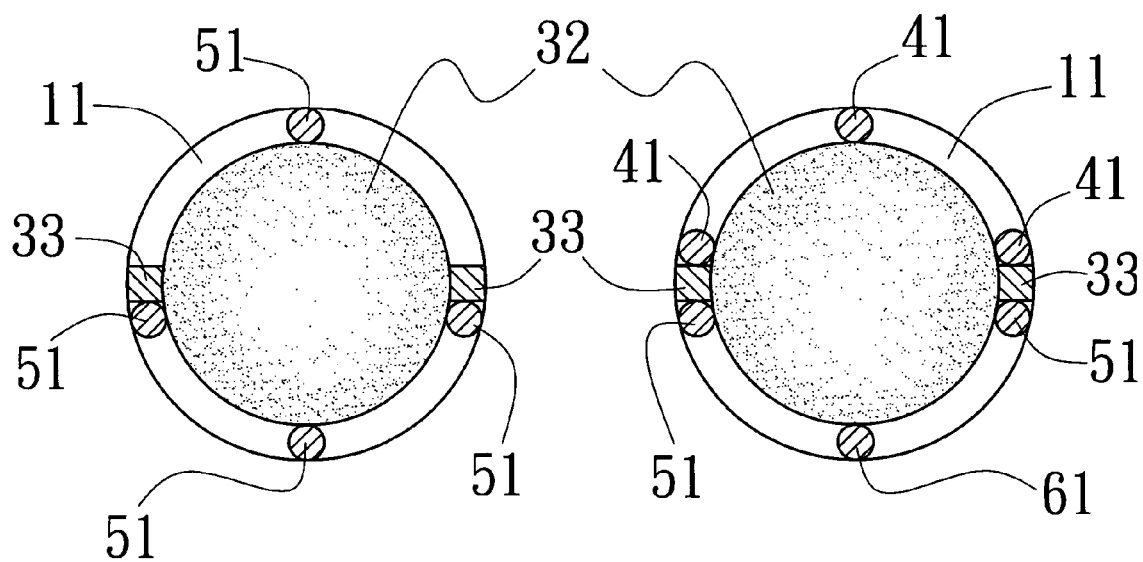

FIGS. 5(A) through 5(D) show how the guiding frame is installed with the rolling member. Here, the rolling element 32 is a round ball. Referring to FIG. 5(A), the guiding frame 60 installed in the circulation tunnel has two guiding spots 61 together with a linking chain 33 to guide the motion of the rolling element 32 so that the rolling member (not shown) is able to circulate along the circulation tunnel heading in a predetermined direction. In FIG. 5(B) and FIG. 5(C), their guiding frames 40 and 50 respectively have three and four guiding spots 41 and 51 to guide motion of the rolling member 32. The combined configuration of the above three types of guiding frame is shown in FIG. 5(D), wherein six guiding spots 41, 51, and 61 of the guiding frames 40, 50, and 60 are disposed around the inner wall of the circulation tunnel 11 to guide the traveling direction of the rolling member 32.

Figures 6A, 6B:
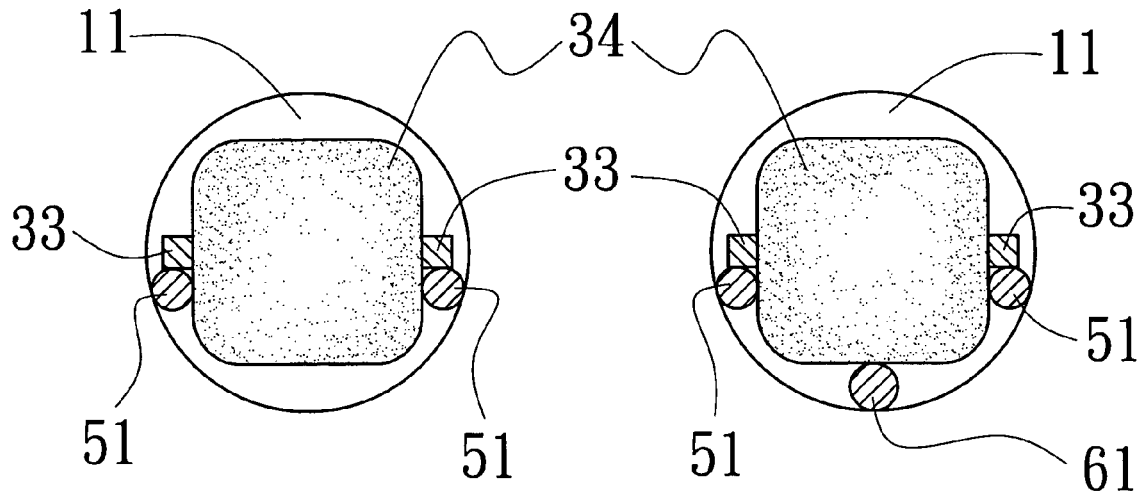
FIGS. 6(A) through 6(D) are schematic views showing the positional relation between the guiding frame and the rolling member in another embodiment.
Figures 6C, 6D:
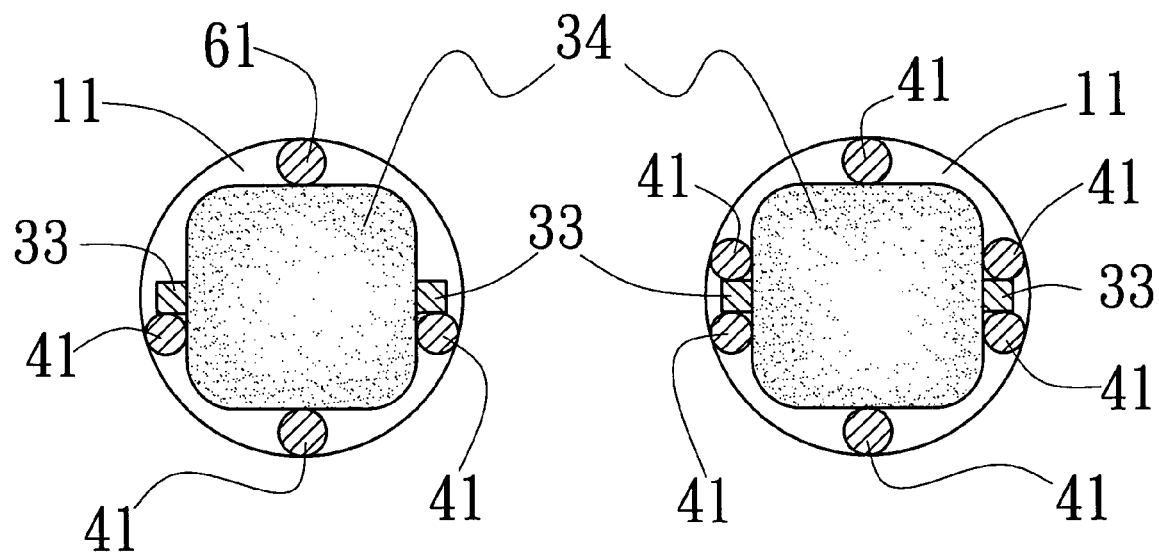

FIGS. 6(A) through 6(D) are schematic views showing the positional relation between the guiding frame and the rolling member in another embodiment, wherein the rolling element 34 is a cylindrical body. In FIG. 6(A), there are two guiding spots 51 in a guiding frame 50 together with the linking chain 33 to guide the traveling direction of the rolling member 34 in the circulation tunnel 11 thereby the guiding member (not shown) is able to circulate along the circulation tunnel 11 heading in the predetermined direction. In FIG. 6(B), the guiding frame 50 and 60 are coupled together to guide the traveling direction of the rolling element 34 with two guiding spots 51 and one guiding spot 61. In FIG. 6(C), the coupled guiding frames 40 and 60 guide the traveling direction of the rolling element 34 with three guiding spots 41 and one guiding spot 61. In FIG. 6(D), similar to the configuration described in FIG. 5(d), there are altogether six guiding spots 41 of the guiding frame 40 used to guide traveling direction of the rolling element 34.

Figure 7:
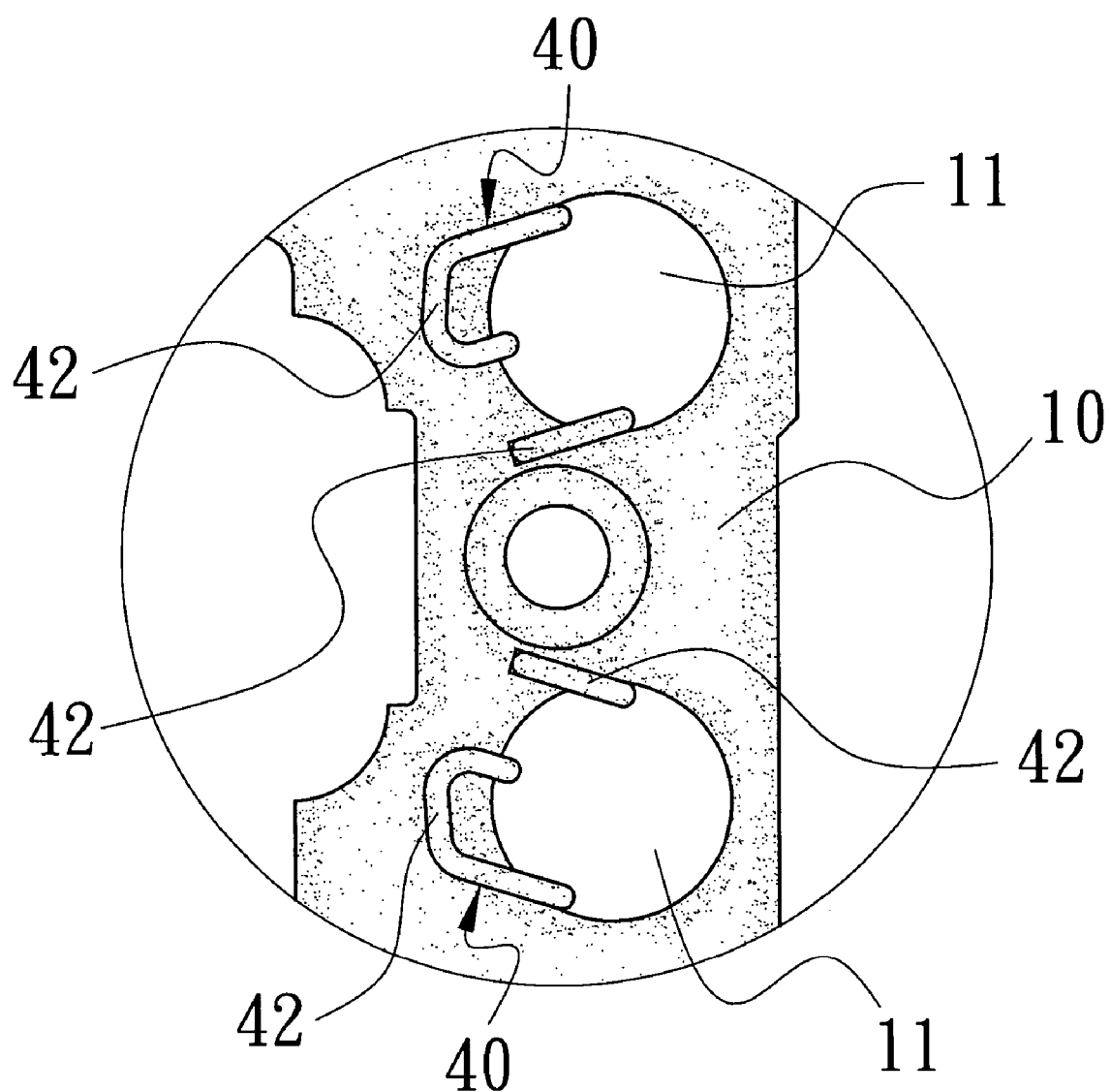
FIG. 7 is a schematic view showing how the guiding frame is installed in the rolling member guiding structure of the present invention.

For understanding how the guiding frame is installed in the rolling member guiding structure of the present invention, reference can be made to FIG. 7 in which each retainer 42 of the guiding frame 40 is retained on the end cover of the sliding block 10 so as to be kept stationary in the circulation tunnel 11 of the sliding block 10.

Figure 8:
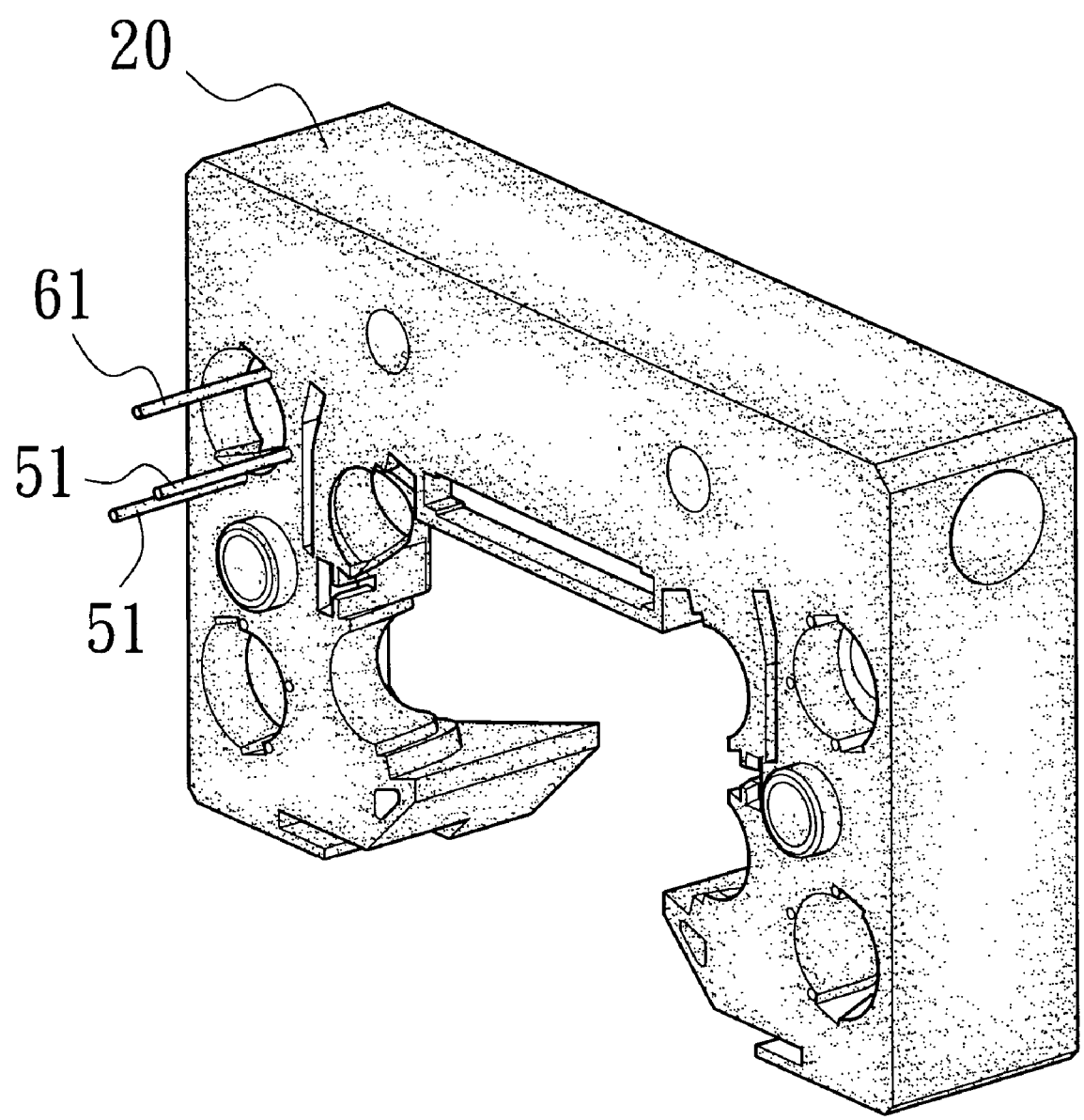
FIG. 8 is a schematic view showing how the guiding frame is installed in the rolling member guiding structure in another embodiment of the present invention.

FIG. 8 shows another embodiment for installing the guiding frame in the rolling member structure, and it differs from the way shown in FIG. 7 in that no retainer is provided for the guiding frame. As shown in FIG. 8, no retainer is provided for the extended ends of the guiding spots 51 and 61. However, the guiding frame 50 and 60 are directly inserted into fitting holes prepared on the end cover 20 and are fixed there.

In all, it is obvious from the above description that the rolling member guiding structure disclosed by the present invention has many prominent advantages compared to existing ones. It is a high level technical creation which, prior to the application for patent, has never been published or put to public use, nor preceded by an identical invention or creation already patented. The present invention is by no means one that can simply utilizes conventional technology or knowledge known prior to the application for patent or can easily be made by persons skilled in the art.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A rolling member guiding structure installed in a circulation tunnel of a sliding block in a linear transmission mechanism, wherein said guiding structure is a frame formed with a single bar disposed along an inner wall of said circulation tunnel so as to form an inner space of said circulation tunnel into a predetermined guiding space, thereby guiding said rolling member to circulate along said circulation tunnel heading in a predetermined direction.

2. The rolling member guiding structure as in claim 1, wherein said bar has a round cross section.

3. The rolling member guiding structure as in claim 1, wherein said guiding structure is configured into a multi-contact structure with more than two guiding spots.

4. The rolling member guiding structure as in claim 1, wherein said guiding structure is configured into a dual-contact structure with two guiding spots.

5. The rolling member guiding structure as in claim 1, wherein said guiding structure is configured into a single contact structure with only one guiding spot.

6. The rolling member guiding structure as in claim 1, wherein said guiding structure is affixed to both end covers of said sliding block.

7. The rolling member guiding structure as in claim 1, wherein the terminal of said guiding structure is formed into a retainer to affix onto said sliding block.

8. The rolling member guiding structure as in claim 1, wherein said guiding structure is a bent metallic bar.

* * * * *